United States Patent [19]

Molina

[11] 4,443,350

[45] Apr. 17, 1984

[54] METHOD FOR NONDESTRUCTIVE MAGNETIC INSPECTION AND RUBBER-LIKE MAGNETIC RECORDING MEDIUM EMPLOYED THEREIN

[75] Inventor: Orlando G. Molina, Westminster, Calif.

[73] Assignee: Rockwell International Corporation, El Segundo, Calif.

[21] Appl. No.: 8,316

[22] Filed: Feb. 1, 1979

Related U.S. Application Data

[63] Continuation-in-part of Ser. No. 932,893, Aug. 11, 1978, abandoned.

[51] Int. Cl.³ ............................................. H01F 1/117
[52] U.S. Cl. ................................. 252/62.54; 250/216; 252/62.53
[58] Field of Search ................................ 324/213–216, 324/228, 263; 252/62.51, 62.52, 62.53, 62.54, 62.56; 250/216; 427/128

[56] References Cited

U.S. PATENT DOCUMENTS 4,098,935 7/1978 Knudsen ................................ 428/40
4,146,671 3/1979 Fujiyama et al. .................... 428/328

*Primary Examiner*—F. Edmundson
*Attorney, Agent, or Firm*—Charles T. Silberberg; Max Geldin

[57] ABSTRACT

Magnetizable recording medium for nondestructive magnetic particle inspection of an object or part, for detection of defects and metallurgical conditions therein, in the form of a rubber-like resilient pad, e.g. a cast silicone rubber pad, having dispersed therein magnetic oxides, e.g. ferromagnetic particles, of high magnetic retentivity, and having high magnetic remanent flux density, e.g. of the order of about 1,850 gauss, or higher, and a magnetic coercive force of the order of about 280 oersteds, or higher. There can be embedded or sandwiched into the magnetizable rubber-like pad an open-mesh fabric, e.g. a silk layer, to provide magnetic recordable pads of improved dimensional stability and reuseability. Such magnetic recording medium or pad is placed on the surface of the object, the object and pad are magnetized to record on such pad, magnetic indications of such defects and metallurgical conditions, the pad is removed from the object, and a viewing device is placed on the area of the magnetized rubber-like pad previously in contact with the object, such device preferably being one containing a suspension of weakly magnetic crystals in a transparent liquid vehicle, and viewing through such device the outlines and indications of the defects and metallurgical conditions in the object, produced by the re-orientation of the magnetic particles of the suspension, and corresponding to the magnetic indications recorded on the magnetized rubber-like recording medium or pad. The magnetically recordable rubber-like pad can be used to record multiple recordings of a plurality of cracks at any angles to each other, or to make multiple recordings of parallel cracks or duplicate recordings of the same crack, without erasing the initial crack recording, or can be used to determine the depth of a crack. The magnetized recording pad can be demagnetized and erased by application of a high coercive demagnetizing flux, and reused.

16 Claims, 10 Drawing Figures

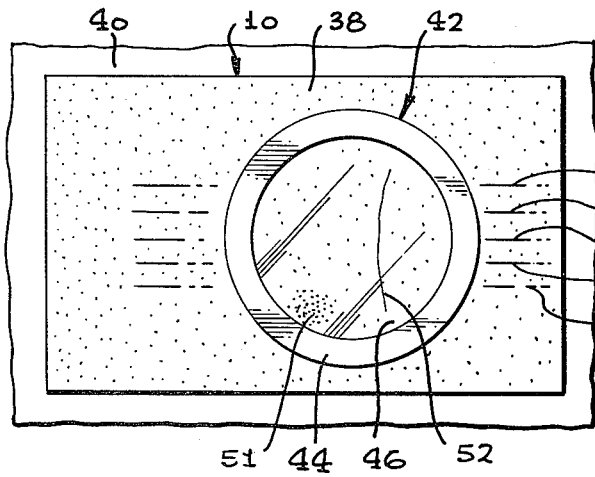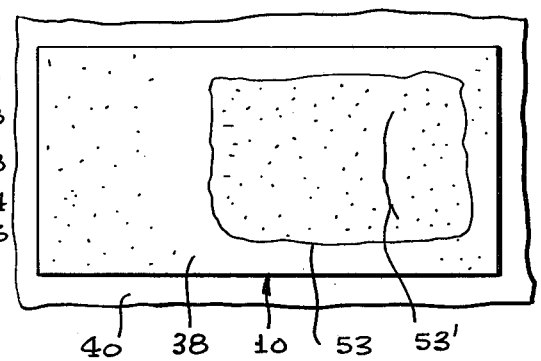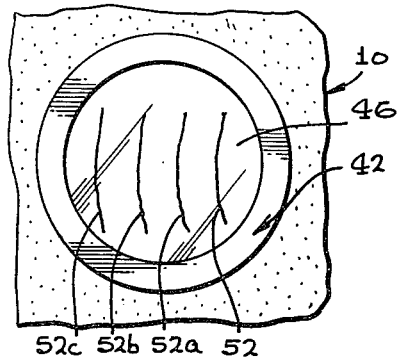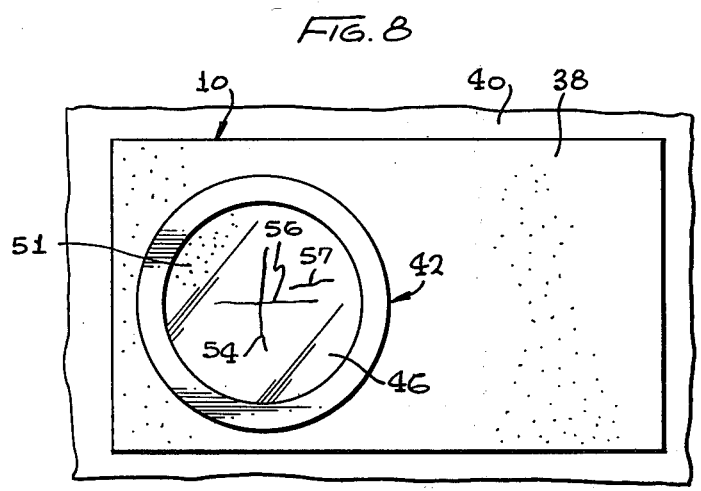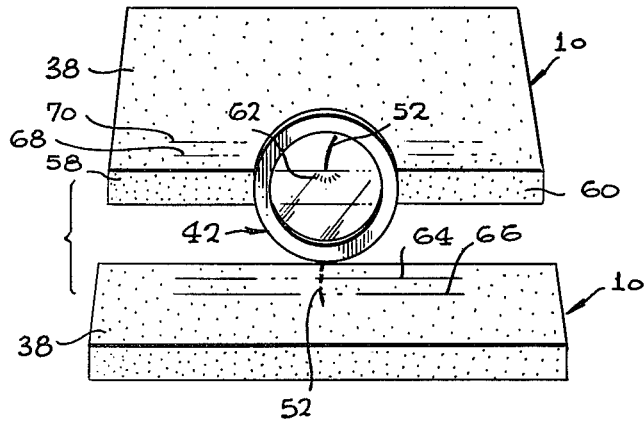

METHOD FOR NONDESTRUCTIVE MAGNETIC INSPECTION AND RUBBER-LIKE MAGNETIC RECORDING MEDIUM EMPLOYED THEREIN

This application is a continuation-in-part of copending application Ser. No. 932,893, filed Aug. 11, 1978 now abandoned, which was a continuation-in-part of Ser. No. 678,279 filed Apr. 19, 1976, now U.S. Pat. No. 4,110,236.

BACKGROUND OF THE INVENTION

This invention relates to nondestructive testing of bodies or objects by magnetic particle inspection procedure, for detecting of defects and metallurgical conditions, e.g. cracks and flaws, particularly in the surface of the body, and is particularly concerned with simple methods for facile and rapid magnetic particle inspection of bodies utilizing a novel magnetic recording medium which permits magnetic recording of images of defects oriented at any angle, or of defects parallel to each other, and which also permits obtaining magnetic indications of the depth of a crack or defect, employing a viewing device, preferably containing weakly magnetic crystals, or other suitable viewing means, in conjunction with such novel magnetic recording medium.

Conventional magnetic particle inspection methods for nondestructive testing of bodies employ solutions or powders of magnetic material with no magnetic retentivity, such as iron oxides, which are applied to the surface of the object and build up over cracks or defects contained in bodies of magnetic materials such as steel. In these methods the magnetic particles generally are directly deposited over the surface of the objects or parts, contaminating them. Such magnetic particles are used up in the process and they are generally not recoverable since they attach or adhere to the magnetized surface of the parts being inspected. Thus, the magnetic particles in these methods contaminate the surface of the objects being inspected. Further in these conventional methods for nondestructive flaw and crack detecting, the magnetic flux applied to the object must be induced at right angles to the suspected cracks and defects for satisfactory results. Further, in conventional methods when 2 or more cracks are present at different angles, it is necessary to reorient the magnetizing field for each of such cracks independently and in separate operations; otherwise, the magnetic indications of the crack previously recorded will be erased or obliterated by the last "shot" of magnetizing flux.

U.S. Pat. No. 3,862,047 discloses casting replicas of holes in a workpiece, such as a fastener recess, employing a liquid vulcanizable silicone rubber containing a hydrocarbon solvent or diluent, such as naphtha, and a catalyst, and ferromagnetic or iron oxide particles. This liquid magnetizable composition is placed in the hole or fastener recess to be inspected, a magnetic field is applied prior to setting up, or curing the mixture, to cause the magnetic particles to migrate to any cracks or flaws which are present, and following curing or hardening, the solid rubber replica is removed from the hole or recess for visual hardening. However, such solid rubber replica is tailored for that specific use or hole alone, and cannot be employed for inspecting other cracks or defects on or closely adjacent the surface of the part.

In British Pat. No. 1,237,864 there is disclosed a method for examining ferromagnetic or magnetizable materials employing a magnetic recording medium comprising a pad of deformable plastic or resilient material impregnated with magnetic recording material which may be magnetizable particles, and which, following magnetization, produces a visible record of the magnetization pattern of the body and an indication of the surface features of the body. However, the deformable or resilient magnetic recording medium of this patent is not of a composition, particularly with respect to the magnetic particles employed therein, which will provide indications of cracks or flaws by means of invisible magnetic indications in the magnetized recording medium which are made visible through the use of suitable means, e.g. a viewer, and such magnetic recording medium does not have the characteristics which permit obtaining indications of cracks or defects oriented at any angle to each other, or which can be applied to indicate the relative depth of a recorded defect.

Further, conventional magnetic particle inspection procedure of the prior art and as used in nondestructive testing throughout the industry is only capable of revealing indications of defects usually in one general direction which is preferentially at a 90° angle to the lines of magnetic flux applied to the ferromagnetic part being inspected. If the magnetic flux is re-oriented to be parallel to the first formed indications the indications will be erased. This is an extremely undesirable characteristic of all conventional nondestructive magnetic particle inspection test processes used today. Further, the depth of a crack or defect located with conventional methods can only be verified by destructively cutting the part at a 90° angle to the crack or defect. Also, many of the prior art processes in which the parts are directly contacted with magnetic particles are contaminating to the parts being inspected due to the abrasiveness of the magnetic particles (iron oxides) being used.

SUMMARY OF THE INVENTION

It is accordingly one object of the present invention to provide novel magnetic inspection procedure employing a magnetizable recording medium for indicating the presence of cracks or flaws in the surface of an object, such cracks or flaws being positioned at any angle to each other or parallel to each other, without erasing the magnetic indications of the initially recorded crack. Another object is the provision of magnetic inspection procedure employing a magnetic recording medium which permits obtaining indications of the depth of a magnetically recorded defect or crack in the surface of an object. A still further object is to provide a magnetizable recording medium for use in nondestructive magnetic inspection procedures of the above type, which can provide a permanent record of images of cracks and defects oriented at any angle to each other or parallel to each other, or to indicate the depth of a recorded defect, but which can be erased and reused if desired, and which is easy and inexpensive to manufacture. Other objects and advantages of the invention will appear hereinafter.

It has been found according to the present invention that the above objects can be achieved by the provision of a magnetic recording medium in the form of a rubber-like matrix or pad having dispersed therein magnetic oxide particles having certain characteristics as described below, and which can "memorize" a signal corresponding to the cracks in an object, which signals are made visible by means such as a magnetic viewer or magnetic particles in a liquid suspension, matching the configuration of a crack or defect in a part. The magnetizing particles have a high magnetic remanent flux density, and a high magnetic coercive force, as defined hereinafter, and hence have high magnetic retentivity. Thus, following application of a magnetic flux to the recording medium in contact with the object surface, by repositioning the direction of the lines of magnetic flux, magnetic recordings of a crack or cracks at an angle, e.g. at right angles, from the first crack or cracks recorded, can be made in the rubber-like recording medium without erasing the first or initial crack recording or recordings. The same procedure can be employed for obtaining multiple recordings of cracks which are essentially parallel to each other without erasing the first or initial recordings.

Another important feature of the rubber-like recording medium of the present invention is its ability to indicate the depth of a magnetically recorded defect. This is accomplished by placing the magnetically recordable pad against the part or metal surface having a crack or defect therein. A magnetizing source such as an electromagnetic probe is placed in contact with the part and the part is subjected to a magnetic flux which intersects the suspected crack or defect. After the magnetized rubber-like recording medium or pad is removed from the part and turned bottom up to expose the surface thereof which had previously been in contact with the surface of the part, a magnetic viewer is pressed against the pad and moved about until the indication of a crack is seen in the viewer. Such viewing device is responseive to the magnetic indications recorded on the magnetized rubber-like material and is of a type preferably enclosing a suspension of weakly magnetic crystals in a transparent liquid vehicle and containing a transparent portion to permit viewing of the suspension. The suspended magnetic crystals in such viewing device reorient to form visual magnetic crystal indications corresponding to the invisible magnetic indications recorded in the magnetic rubber-like recording medium, and providing sharp indications of the cracks or defects in the part. Such viewing device is disclosed in my above U.S. Pat. No. 3,978,398.

In place of such viewing device, there can be applied to the surface of the recording medium, following its removal from the part, fluorescent or non-fluorescent magnetic particles, or a liquid suspension of such particles, to provide visual indications of the cracks or defects in a part.

To obtain an indication of the depth of the crack, the magnetic indication of the crack recorded in the rubber-like recording medium or pad can be intersected by cutting the rubber pad essentially transversely of the length of the crack indications. One or more such transverse cuts can be made at any point or points along the length of the recorded crack to study its depth at these points. This is accomplished by pressing the magnetic viewer described above against the respective cross-sections of the rubber-like pad, and magnetic indications are shown in the viewer of one or a plurality of such cross-sectional views of the cracks at different points along its length. This characteristic and capability of the rubber-like recording medium or pad to be applied for first visually obtaining magnetic indications of the configuration and length of a crack in the surface of a part, and then obtain indications of the size of depth of the crack along the length thereof is a unique feature of the invention.

The above-noted magnetically recorded images in the rubber-like magnetic recording medium or pad can be kept indefinately as a permanent record, or the magnetically recorded images, which are visible by the above noted viewer, can be erased by demagnetization and the rubber-like recording medium or pad can be reused.

As an additional feature of the invention there can be embedded or sandwiched into the rubber-like recording medium or pad, a reinforcing fabric such as a layer of silk fabric to improve the dimensional stability, strength, durability and reproduceability of the magnetic indications of cracks formed in such medium or pad.

The rubber-like resilient recording medium or pad of the invention can be readily and inexpensively manufactured, is non-polluting to the surface of the part to which it is applied, and is constructed of matrix or polymer materials which are preferably nonflammable and nontoxic.

THE DRAWINGS

The invention will be more fully understood by reference to the detailed description below of certain preferred embodiments, taken in connection with the accompanying drawings, wherein:

FIG. 6 illustrates placement of the viewing device of FIG. 5 against the upper surface of the magnetized rubber-like recording medium pad shown in FIG. 1, following magnetization thereof as shown in FIG. 4, for detection of cracks and flaws in the part and removal of the magnetized recording medium from the part surface;

FIG. 6a illustrates a modification of FIG. 6, employing a liquid suspension of magnetic particles applied to the magnetized recording medium;

FIG. 7 illustrates the viewing of magnetic indications of a multiple magnetic indications image of the same crack;

FIG. 8 illustrates the recording in the rubber-like pad of magnetic indications of cracks which are oriented at various angles with respect to each other; and FIG. 9 illustrates the recording of a magnetic "blip" or indications which are related to the depth of a crack in the rubber-like recording medium or pad, and the procedure for indicating the depth of a crack at various points along the length thereof.

DESCRIPTION OF PREFERRED EMBODIMENTS

Figure 1:
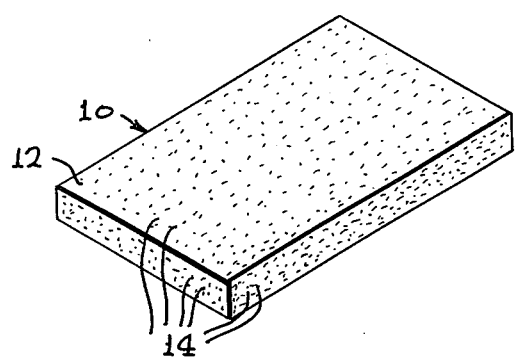
FIG. 1 is a perspective view of a rubber-like resilient magnetic recording matrix or pad according to the invention.

Referring to FIG. 1 of the drawing, the rubber-like magnetically recordable medium or pad, indicated at 10, is formed of a rubber-like matrix 12 having dispersed therein non-migrating magnetic particles 14 which are capable of "memorizing" a signal when the rubber-like recording medium or pad is placed on the surface of a part composed of a magnetic material and having cracks or other flaws therein, and the part is magnetized.

The rubber or rubber-like matrix 12 of the recording medium is formed from a suitable polymer or resin, preferably in liquid form, which is capable of curing or hardening to a rubbery consistency. Such resins can be of a type which are cured at room temperature or at elevated temperature. A suitable polymer or resin for this purpose is a liquid silicone polymer, e.g. dimethyl polysiloxane or methyl phenyl polysiloxane, in liquid form and containing a suitable curing agent and/or catalyst. An exemplary form of polymer material for this purpose is the material marketed as Resin 184 by Dow Corning or the material marketed as RTV Silicone Rubber by Dow Corning, comprised of a curable dimethyl polysiloxane. A suitable curing agent such as ethyl silicate, in a suitable proportion, e.g. about 5 to 10%, based on the silicone to be cured can be used.

However, other resins curable to a rubbery consistency, such as natural rubber, neoprene-type polymers, and the like, can be employed for producing the matrix of the rubber-like recording medium or pad.

Magnetic particles of a type employed in magnetic tape utilized for audio or video recording, and of high remanent flux density, high coercive force and high magnetic retentivity are incorporated into the liquid, e.g. silicone, resin prior to curing thereof. Such magnetic particles can be magnetic oxides of a fine size, e.g. a size ranging from about 40 to about 5 microns can be used. The magnetic particles employed are of the type having a high magnetic remanent flux density, preferably of at least about 1,850 gauss, and ranging, for example from about 1,850 to about 2,000 gauss, and high magnetic coercive force, preferably of at least about 280 oersteds, and ranging, for example, from about 280 to about 340 oersteds. Such magnetic particles also have a high magnetic maximum flux density saturation, preferably of at least about 3,450 gauss, and ranging, for example, from about 3,450 to about 3,600 gauss. Magnetic oxide particles having these characteristics have high magnetic retentivity and require a high demagnetizing force in excess of the coercive or magnetizing force of the particles noted above, to erase any magnetic signals or indications previously recorded in the medium in which they are dispersed, such as the rubber-like pad of FIG. 1. As noted hereinafter, this permits recording of magnetic indications of cracks at any angle without demagnetizing or erasing previously recorded crack indications.

Representative types of magnetic particles having these special characteristics are set forth in Table 1 below.

TABLE 1

| Manufacturer and Code Name | Magnetic Oxide Type | Magnetic Coercive Force (Hc) Oersteds | Magnetic Remanent Flux Density (Br) Gauss | Magnetic Maximum flux Density Saturation (Bm) Gauss |
|---|---|---|---|---|
| Hercules | | | | |
| K-300 | Fe$_2$O$_3$ | 280 | 2000 | 3500 |
| K-460 | Fe$_2$O$_3$ | 295 | 1900 | 3550 |
| X-3525 | Fe$_2$O$_3$ | 325 | 1850 | 3450 |
| Pfizer | | | | |

TABLE 1-continued

| Manufacturer and Code Name | Magnetic Oxide Type | Magnetic Coercive Force (Hc) Oersteds | Magnetic Remanent Flux Density (Br) Gauss | Magnetic Maximum flux Density Saturation (Bm) Gauss |
|---|---|---|---|---|
| MO-2228 | Fe$_2$O$_3$ | 340 | 2000 | 3600 |

Average particle size is 10 microns. Shape of particles are acicular in nature and of gamma ferric oxide.

The amount of such magnetic particles incorporated into the rubber-like matrix material or resin can vary to obtain an effective recording medium for purposes of the invention. Generally, there can be employed about 4 to about 50% of such magnetic particles, by weight of the matrix material or polymer. Usually, it is preferred not to employ more than about 40% by weight of magnetic particles, e.g. about 4 to about 40% by weight of such particles, since with amounts of magnetic particles more than 40% by weight, there is a tendency of the rubber-like matrix to lose strength and to commence crumbling. Preferably, about 4 to about 30% by weight of magnetic particles is employed. If the amount of magnetic particles used is less than about 4% there is a tendency toward loss of signal resolution. An optimum proportion of magnetic oxide particles is about 5 to 15% by weight of the matrix material or polymer.

In preparing the rubber-like or rubbery recording medium or pad according to the invention, the highly magnetic or ferromagnetic particles as described above are added to the liquid polymer composition in suitable amount, e.g. about 5 to about 15%, by weight of such liquid polymer composition. The resulting liquid composition is mixed or stirred so as to distribute substantially uniformly therein, the magnetic particles. The resulting mixture or suspension of the magnetic particles in the liquid polymer is poured into a suitable mold having the desired pad configuration, e.g. of rectangular shape as shown at 10 in FIG. 1 of the drawing. The liquid polymer composition, e.g. silicone polymer, is then permitted to cure either at room temperature or at elevated temperature in an oven, depending upon the particular polymer composition employed, for a sufficient period of time to permit curing, e.g. from about 5 minutes up to 1 hour or more. As previously noted, curable polymers other than silicones can be employed to form a cured material having a firm rubbery resilient consistency, such as natural rubber or neoprene-type polymers.

The following are examples of preparation of rubber-like recording media or pads according to the invention.

EXAMPLE 1

The following liquid formulation of liquid polymer and suspended magnetic particles was prepared:

TABLE 2

| COMPOSITION A | |
|---|---|
| Components | grams |
| Silastic resin 184 (Dow Corning) | 50 |
| Pfizer magnetic oxides No. 2228 | 5 |
| Hardener for resin | 5 |
| | 60 |

Resin 184 - a liquid silicone resin
Hardener - 184 catalyst (Dow Corning)

In preparing the above liquid formulation or suspension, the magnetic oxide particles were first screened through an 80 mesh screen and the magnetic particles were than evenly dispersed into the silicone liquid casting resin by stirring. The resulting mixture or suspension was then poured into a rectangular open mold having a flat smooth bottom. The liquid polymer in the mold was cured in an oven at 200° F. for about an hour to produce a final cure. The finally cured cast pad was removed from the mold and was in the form of a firm but resilient rubbery pad having the ability to quickly regain its original shape when flexed or distorted, the magnetic oxide particles being uniformly distributed throughout the rubbery polymer matrix.

EXAMPLE 2

The following formulation of liquid polymer containing dispersed particles of magnetic oxides was prepared.

TABLE 3

| COMPOSITION B | |
|---|---|
| Components | grams |
| Silastic resin 184 (Dow Corning) | 50 |
| Hercules magnetic oxides K-460 | 5 |
| Hardener for resin-184 catalyst | 5 |
| | 60 |

The procedure of Example 1 was essentially followed in the preparation of the above formulation or suspension, composition B, of liquid silicone resin and magnetic oxide particles, and the curing of such liquid polymer suspension to produce a rubbery resilient magnetic recording pad comprised of cured polymer matrix having magnetic particles dispersed therein, as illustrated at 10 in FIG. 1.

According to a further feature of the present invention, it has been found that the incorporation of a fiber reinforcing layer in the polymer matrix of the recording pad provides a rubbery magnetic recording pad according to the invention, having improved dimensional stability and reuseability, as described in greater detail below. Such reinforcing fabric can be any open mesh fabric such as silk, nylon, acrylics, cellulose acetate, and the like. A layer of such fabric is embedded in the polymer matrix, as by being sandwiched between two layers of the rubbery polymer matrix containing the magnetic oxides during molding thereof.

Figure 2:
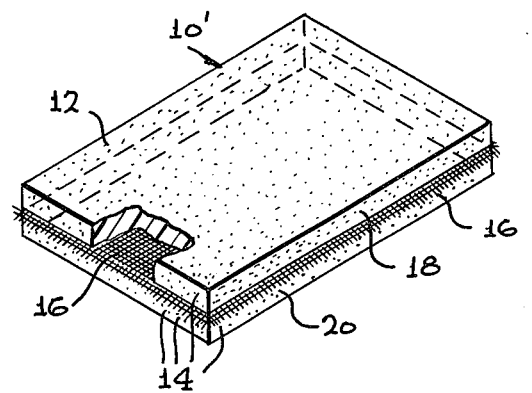
FIG. 2 is a perspective view of a modification of the rubber-like recording medium of FIG. 1, containing a layer of reinforcing fabric, shown partly broken away for greater clarity.

Thus, referring to FIG. 2, there is shown the above feature or modification, in the form of a rubber-like resilient pad 10' containing a fabric reinforcing layer, e.g. a layer of silk at 16, sandwiched between two layers 18 and 20 of the matrix 12, containing the magnetic oxide particles 14. If desired, more than two such layers can be employed, although a single layer of the fabric embedded at about the center of the matrix depth has been found effective. The fabric reinforcing, e.g. silk, layer 16 embedded in the polymer matrix does not affect the rubbery or resilient properties of the matrix. When utilizing a fabric impregnated rubbery recording medium or pad of this type, it has been found that such reinforcing fabric layer permits the use of up to 50% of magnetic oxide particles by weight of the polymer matrix, without causing any crumbling or disintegration of the polymer, to obtain strong signal resolution.

The following is an example of production of a magnetic recording pad according to the embodiment of FIG. 2.

EXAMPLE 3

The procedure of Example 2 was followed except that when pouring the suspension of liquid polymer and magnetic oxides into the mold, only about ½ of the depth of the mold was first filled, after which a layer of silk having approximately the same dimensions as the rectangular mold was positioned across the upper surface of the liquid suspension within the mold. The remaining upper half of the mold above the layer of silk was then filled with the liquid polymer suspension of magnetic particles.

The resulting rubber-like pad 10' containing the embedded layer of silk was then removed from the mold.

Figure 3:
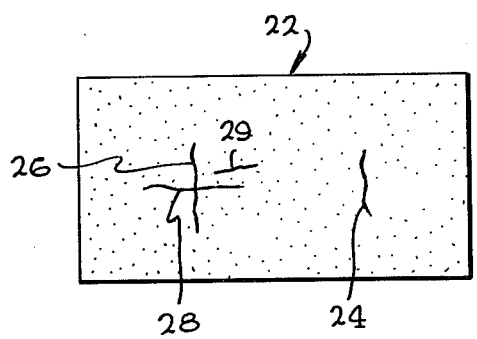
FIG. 3 illustrates a part surface having a plurality of cracks therein oriented at different angles.
Figure 4:
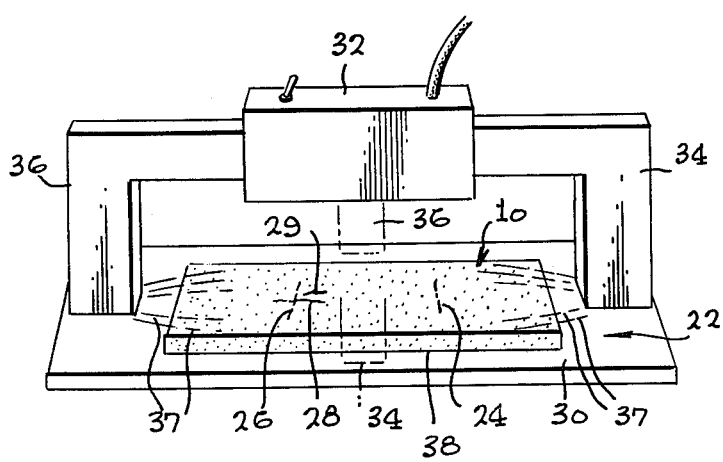
FIG. 4 illustrates the part surface of FIG. 3 to be inspected and the placement of the rubber-like recording medium or pad of FIG. 1 on the surface of the part in FIG. 3, and the establishment of a field of magnetic flux lines around the object to be inspected and the rubber-like recording medium thereon.

Referring now to FIGS. 3 and 4 of the drawing, the process of the present invention employing a rubber-like magnetic recording pad, is applied for revealing and locating cracks or other flaws in a part or object 22 having a crack indicated at 24, a pair of intersecting transverse cracks 26 and 28, and a non-intersecting crack 29. The part 22 is composed of magnetic material such as PH 15-7 Mo steel, a stainless steel which is poorly magnetic steel, 4130 steel which is a higher magnetic steel, and the like. The rubber-like magnetic recording medium, such as 10, containing the magnetic particles is placed over the surface area of the part 22 containing the above noted cracks, and is brought into close engagement with the surface of the part to prevent any air gaps, as seen in FIG. 4, by gently pressing with the fingers.

The part 22 having the magnetic recording pad 10 in contact with the surface 30 of the part and exposed over the suspected cracks 24, 26 and 28, is magnetized by placing an electromagnet 32 over the part, legs 34 and 36 of the electromagnet being positioned in contact with the part surface and over the recording medium or pad 10. It will be understood that such magnetization of the part and the recording medium, that is the magnetizable rubber-like pad 10, can be effected by any conventional magnetic particle inspection equipment, e.g. electromagnet or permanent magnet. The magnetizing "shot" is performed so as to establish a field of magnetic flux lines 37 which intersect the suspected defect or defects, e.g. 24 and 26. Due to variations in magnetic permeability of the part at the location of the crack, e.g. 24 and 26, and the resulting field leakage at such cracks, and the resulting variation in magnetic permeability produced in the magnetizable recording pad 10 by the magnetic field, magnetic indications or signals of the configuration of the crack as at 24 and 26, in part 22, are recorded in the rubbery magnetic pad or recording medium 10, particularly adjacent to the lower surface 38 of the recording medium which is in contact with the surface 30 of part 22.

Figure 5:
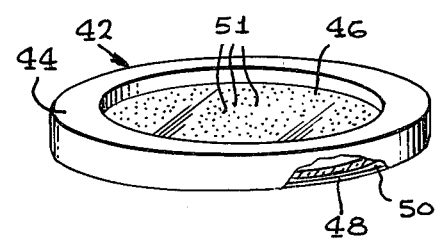
FIG. 5 is a perspective view, partly broken away, of an exemplary viewing device employed in the invention procedure.

Now referring to FIG. 6, following such magnetization of the part 22 and the magnetic recording medium 10, and the recording of the magnetic indications of the cracks as at 24 in such medium, the recording medium 10 is removed from the part, and with the medium turned downside up, such medium is placed flat on a supporting surface or table 40, with the surface 38 of the rubber-like recording medium, which had previously been in contact with the surface 30 of the part, facing upward. A viewing device 42, e.g. of the type more clearly seen in FIG. 5, is then pressed against the surface 38 of the magnetic pad 10.

Such viewing device is of the type disclosed in my U.S. Pat. No. 3,978,398, and comprises a circular ring-shaped non-ferromagnetic hollow container or vessel 44 having a clear glass viewing window 46 at the center and a metal shim 48 attached to the bottom of the container and spaced from the viewing window 26 so as to form a shallow cavity 50 between the lower surface of the window 46 and the shim 48. Such hollow cavity is filled with a suspension of weakly magnetic crystals 51 in a transparent liquid vehicle such as water. These crystals can be in the form of flat alpha-$Fe_2O_3$ crystals, e.g. in a concentration of about 2% by weight. Such weakly magnetic crystals orient when suspended in liquid in a magnetic field. The individual magnetic crystals essentially do not migrate, but simply shift position or reorient when subjected to a magnetic field. Such reoriented crystals are clearly visible through the transparent window 46.

With the opaque shim 48 of the viewing device in contact with and pressed against the surface 38 of magnetic pad 10, as seen in FIG. 6, the invisible magnetic signals or magnetic indications recorded on the magnetic pad 10 adjacent its surface 38 cause the weakly magnetic crystals suspensed in the liquid within the viewing device to quickly reorient, so as to reproduce the magnetic signals from the recording medium. Such re-orientation of the magnetic crystals in the viewing device produces a marked change in reflectivity and a corresponding sharp outline and indication, as at 52 of the crack 24 in the part 22, which is clearly visible through the transparent viewing window 46 of the viewing device. It is noted that due to the non-migrating characteristics of the magnetic particles in the rubber-like recording pad 10, the magnetic recording produced therein is invisible without the use of the magnetic viewer 42, which when initially placed on the surface of the recording pad 10 is moved about thereon until the visible reproduction of the magnetic signal at 52, indicating the presence and location of the suspected crack 24, comes into view in the viewing device 42.

Alternatively, as seen in FIG. 6a, magnetic particles in a liquid, e.g. aqueous or solvent, suspension, indicated at 53 can be applied, e.g. as by brushing, directly to the surface 38 of the magnetic pad 10, to produce visible magnetic indications 53' of the magnetic signals recorded on recording pad 10.

Referring to FIG. 7, multiple images 52, 52a, 52b and 52c of the same crack 24 can be obtained by progressively moving the viewing device 42 in steps to the right, viewing FIG. 6, to obtain the multiple images of the crack shown in FIG. 7, without erasing any of the previously recorded images of the same crack. This unique property of the magnetic recording medium 10 of the invention is useful for verification purposes, that is, to verify that the image 52 of the crack initially seen in the viewer 42 is in fact the image of the crack 24 in the part 22 and not some mistakenly recorded or fugitive image.

Referring now to FIG. 8 of the drawing, there is illustrated another feature of the invention process employing the unique rubber magnetic recording pad of the invention. In this embodiment, after the part 22 in FIG. 4 has been magnetized with the electromagnet 32 in the position shown in FIG. 4 to record invisible magnetic signals or magnetic indications of crack 26 as well as crack 24 by the establishment of a magnetic flux field transversely of such cracks between the electromagnet poles 34 and 36, the electromagnet 32 is simply reoriented 90° from its position on the part shown in FIG. 4, without moving the magnetic recording pad 10, so that the poles 34 and 36 are now positioned in the dotted line location shown in FIG. 4. The electromagnet is then energized to provide a magnetic field of flux between the legs 34 and 36 which is now applied transversely across the cracks 28 and 29 to record invisible magnetic signals of the cracks 28 and 29, as well as the previously recorded intersecting transverse crack 26. The recording of the magnetic indications of the transverse cracks 28 and 29 following the recording initially of crack 26 is accomplished without any erasing of crack 26 which would ordinarily take place using conventional magnetic particles. The reason that transverse cracks can thus be recorded in succession on the magnetic recording pad 10 according to the invention is due to the high magnetic remanent flux density and high coercive force of the magnetic particles employed according to the present invention.

When the magnetic recording medium 10 is removed from the part 22 and the recording medium pad 10 is turned with its lower surface 38 upward as in FIG, 8, and the viewer 42 is moved along the upper surface 38 of the recording pad 10 until the viewer is above the magnetic signals of cracks 26, 28 and 29 recorded in the magnetic pad 10, sharp magnetic signals of both the intersecting cracks 26 and 28 and of crack 29 will become visible at 54, 56 and 57, respectively in the window 46 of the viewer. Hence it is seen that the invention process employing the above described rubber-like magnetic recording medium can be applied for recording indications of cracks which are transversely oriented or are oriented at any angle to each other by simply reorienting the subsequent magnetizing "shot" or "shots" without moving the magnetized recording pad. Conventional magnetic particle inspection methods also require two differently oriented magnetizing "shots" to fully reveal cracks at an angle to each other such as transversely oriented cracks. However, in conventional magnetic particle inspection methods, a subsequent magnetizing "shot" will erase the magnetic particle indications obtained by the previous "shot."

According to another important feature of the invention, the invention process employing the rubber-like recording medium or pad is capable of indicating the depth of a magnetically recorded defect or cracks in a part. Conventional methods for determining the depth of a crack can only be verified by destructively sawing the metal at a 90° angle to the crack or defect. According to the present invention, as illustrated in FIG. 9, the depth of the crack 24, for example, in part 22 can be determined by first magnetizing the part 22 with the recording medium 10 thereon, as indicated in FIG. 4. The magnetic recording medium 10 is then removed from the part surface, placed on a table with the bottom surface 38 of the recording medium facing upward, as in FIG. 6, and the viewer 42 is positioned over the magnetic indications of crack 24 to obtain the visual indication 52 of the planar configuration and length of the crack 24 in the viewer.

With the location of the magnetic indication 52 lengthwise of crack 24 as seen in FIG. 6, the magnetized pad 10 is cut in half along a center line indicated at 58 in FIG. 6, which extends transversely across the visual magnetic indication 52 of the crack at about the center of the crack. The magnetic viewer 42 is then placed against the cross section 60 of the magnetic pad 10, as seen in FIG. 9, until the viewer shows a visual magnetic indication of a disturbance or "blip", as at 62, caused by the magnetically recorded crack as previously seen at 52 in the previously uncut rubber pad, indicating the depth of crack 24 at about the center thereof.

In order to obtain indications of the depth of the crack at various points along its length, the magnetized recording pad 10 containing the magnetic indications 52 of crack 24, can be cut into a plurality of more than two pieces, by cutting it along a plurality of additional transverse lines such as 64, 66, 68 and 70, which are parallel to and on opposite sides of the center cutting line 58, and are positioned transversely of the crack indications 52. By placing the viewer against each of the cross sections thus formed, in the manner illustrated in FIG. 9, indications of the depth of crack 24 at various locations along its length can be determined by the "blip" indications seen in the viewer 42, as at 62 in FIG. 9. Such subsequent "blip" indications will become smaller at sections of the pad adjacent the ends of the magnetically recorded crack 52, thus indicating a relationship between crack depth and size of blip indication adjacent the surface 38 of the recording pad. In other words, the "blip" indication in a cross section at one end of the crack will show a very shallow visual indication, the "blip" indication in the next cross sectional increment will show a deeper visual indication, etc., with the deepest indication being shown at the center cross section as at 60 in FIG. 9, and the "blip" indications in subsequent cross sections on both sides of the center cut will become shallower as the opposite ends of the magnetically recorded cracks 52 are approached.

The above noted characteristic and capability of the invention process employing the rubber-like magnetic recording pad of visually "reading" the top surface showing the length of the recorded crack in a part surface, and also visually reading cross sections of the crack to determine its depth is a particularly unique and important feature of the invention, since for the first time in magnetic particle inspection procedures, it is unnecessary to destroy the pad in order to determine the depth of a crack.

After viewing the magnetic indications or images of the cracks in the resilient magnetic recording pad 10, as illustrated in FIG. 6, such recording medium or pad was demagnetized to erase the magnetic indications from such recording medium or pad, and the viewer no longer showed an image of the above-noted indications. Such demagnetization can be carried out using AC current or decayable DC current. The current must be sufficient to produce a coercive force greater than the coercive force required for initially reorienting the magnetic particles of the magnetic recording medium to record the magnetic indications of cracks or other defects in the part.

Following such demagnetization and erasing of the magnetic indications or signals in the recording pad, the pad was again reused, that is, remagnetized while pressed against another part in the manner described above for detecting cracks and other defects in such part, and excellent images thereof were again obtained by viewing the so-magnetized rubber-like recording medium or pad through viewer 42.

If desired, the magnetic rubber-like recording medium or pad 10 or 10', with the recorded magnetic information thereon of cracks or other defects in a part can be stored and maintained as a record.

A camera, such as a still, movie or television type can be attached to the viewing device 42 when pressed against the magnetic recording medium containing magnetic indications of the condition of a part, to record such magnetic indications.

It will be noted that the process of the present invention employing the rubber-like magnetic recording medium or pad can be applied to parts having irregular or curved surfaces as well as planar surfaces, and can be used without contaminating the part surface with magnetic particles or powders, and without waste of such magnetic particles.

If desired, instead of employing a viewer of the type noted above at 42 for viewing the invisible magnetic indications of cracks or other flaws adjacent a surface of the rubber-like recording pad of the invention, a special magnetic particle suspension can be used to reveal the magnetically recorded cracks or other defects after the pad is placed against the part and the magnetizing "shot" is induced by the electromagnet. Such magnetic particle suspensions can be of the same type as incorporated in the viewer 42, such as an aqueous suspension of weakly magnetic alpha-$Fe_2O_3$ crystals, or conventional magnetic particle suspensions. It is noted that such a suspension is applied directly to the rubber-like recording pad after the pad is removed from the part and thus does not contaminate the part surface. The magnetic particles employed in such suspensions can be fluorescent or non-fluorescent. Also, magnetic powders such as iron oxides used in conventional magnetic particle inspection can be employed.

From the foregoing, it is seen that the invention provides a unique nondestructive testing procedure for obtaining rapid magnetic particle inspection of an object or part, employing a unique rubbery or rubber-like recording medium or pad, without contaminating the part surface, and preferably used in conjunction with a simple magnetic viewing device.

The invention process and magnetic recording medium are not limited for use to inspection of surfaces exposed to air. Since the invention process can be practiced employing a viewer such as indicated at 42 in FIG. 5, without application of magnetic particle dispersions or particles directly to a part surface, the entire process can be practiced under water such as for magnetically inspecting components of submarines, ships, submerged equipment, and the like. Also, since the invention process is not affected by gravity, it can also be employed to magnetically inspect structures in space, such as rockets or components of space stations.

According to the present invention, a method and means are provided to inspect for cracks and other discontinuities which produce magnetic disturbances in magnetized materials, such as the location of machined welds. Such method is characterized by its ability to record images of defects or cracks oriented at any angle to each other, and to indicate the relative depth of a recorded defect by cutting the recording medium into any desired number of sections to bisect such defects or cracks, without cutting the part itself for this purpose. In addition, the recording medium hereof can be used to provide a permanent record, or is reuseable, and is nonflammable, nontoxic and inexpensive to manufacture and use. The rubber-like recording medium employed in the invention process can be made of varying thicknesses and having varying resilience, and can be applied to surfaces which are planar, irregular or curved.

While I have described particular embodiments of my invention for the purpose of illustration within the spirit of the invention, it will be understood that the invention is not to be taken as limited except by the scope of the appended claims.

What is claimed is:

1. A magnetizable recording medium for magnetic inspection of an object comprising a pad of a rubber-like resilient matrix formed of a polymer having dispersed therein $Fe_2O_3$ magnetic oxide particles having a high magnetic remanent flux density of at least about 1,850 gauss and a high magnetic coercive force of at least about 280 oersteds, and wherein said $Fe_2O_3$ particles are non-migrating in said rubber-like resilient material, employing about 4 to about 50% of said magnetic oxide particles by weight of said matrix, said $Fe_2O_3$ magnetic oxide particles permitting obtaining multiple magnetic recordings of cracks at an angle to each other or essentially parallel to each other in the recording medium without erasing the initial crack recording.

2. The magnetizable recording medium of claim 1, said magnetic oxide particles also having a magnetic maximum flux density saturation of at least about 3,450 gauss.

3. The magnetizable recording medium of claim 1, said magnetic oxide particles being in the form of gamma $Fe_2O_3$ particles, by weight of said polymer, said magnetic oxide particles having a magnetic remanent flux density ranging from about 1,850 to about 2,000 gauss, and a high magnetic coercive force ranging from about 280 to about 340 oersteds, and of a fine size ranging from about 40 to about 5 microns.

4. The magnetizable recording medium as defined in claim 3, said magnetic oxide particles also having a magnetic maximum flux density saturation ranging from about 3,450 to about 3,600 gauss.

5. The magnetizable recording medium as defined in claim 3, said rubber-like matrix polymer being a silicone polymer.

6. The magnetizable recording medium as defined in claim 3, employing about 4 to about 40% of said magnetic oxide particles by weight of said polymer.

7. The magnetizable recording medium as defined in claim 3, employing about 5 to about 15% of said magnetic oxide particles by weight of said polymer.

8. The magnetizable recording medium as defined in claim 1, said rubber-like matrix polymer being selected from the group consisting of a silicone polymer, natural rubber and a neoprene-type polymer.

9. A magnetizable recording medium for magnetic inspection of an object comprising a pad of a rubber-like resilient matrix formed of a polymer having dispersed therein $Fe_2O_3$ magnetic oxide particles having a high magnetic remanent flux density of at least about 1,850 gauss and a high magnetic coercive force of at least about 280 oersteds, and wherein said $Fe_2O_3$ particles are non-migrating in said rubber-like resilient material, and having an open mesh reinforcing fabric embedded in said rubber-like matrix.

10. The magnetizable recording medium as defined in claim 9, said open mesh reinforcing fabric being selected from the group consisting of silk, nylon, acrylics, and cellulose acetate.

11. The magnetizable recording medium as defined in claim 9, in which said open mesh fabric reinforcing layer is sandwiched between two layers of said rubber-like matrix.

12. The magnetizable recording medium as defined in claim 9, said rubber-like matrix polymer being selected from the group consisting of a silicone polymer, natural rubber and a neoprene-type polymer.

13. A magnetizable recording medium for magnetic inspection of an object comprising a pad of a rubber-like resilient matrix formed of a polymer having dispersed therein $Fe_2O_3$ magnetic oxide particles having a high magnetic remanent flux density of at least about 1,850 gauss and a high magnetic coercive force of at least about 280 oersteds, and wherein said $Fe_2O_3$ particles are non-migrating in said rubber-like resilient material, and having an open mesh reinforcing fabric embedded in said rubber-like matrix, said matrix containing about 4 to about 50% of said magnetic oxide particles in the form of gamma $Fe_2O_3$ particles, by weight of said polymer, said magnetic oxide particles having a magnetic remanent flux density ranging from about 1,850 to about 2,000 gauss, and a high magnetic coercive force ranging from about 280 to about 340 oersteds, and of a fine size ranging from about 40 to about 5 microns.

14. The magnetizable recording medium as defined in claim 13, said rubber-like matrix polymer being a silicone polymer.

15. A magnetizable recording medium for magnetic inspection of an object comprisng a pad of a rubber-like resilient matrix formed of a polymer having dispersed therein $Fe_2O_3$ magnetic oxide particles having a high magnetic remanent flux density of at least about 1,850 gauss and a high magnetic coercive force of at least about 280 oersteds, and wherein said $Fe_2O_3$ particles are non-migrating in said rubber-like resilient material, and a silk reinforcing fabric embedded in said rubber-like matrix polymer.

16. The magnetizable recording medium of claim 15, said matrix containing about 4 to about 50% of said magnetic oxide particles in the form of gamma $Fe_2O_3$ particles, by weight of said polymer, said magnetic oxide particles having a magnetic remanent flux density ranging from about 1,850 to about 2,000 gauss, and a high magnetic coercive force ranging from about 280 to about 340 oersteds, and of a fine size ranging from about 40 to about 5 microns, said rubber-like matrix polymer being a silicone polymer.

* * * * *